United States Patent [19]

Walter

[11] Patent Number: 4,595,117

[45] Date of Patent: Jun. 17, 1986

[54] SEALING LIP FOR LID ON THERMOFORMED CONTAINER

[75] Inventor: John Walter, Evergreen Park, Ill.

[73] Assignee: Continental Can Company, Inc., Stamford, Conn.

[21] Appl. No.: 766,354

[22] Filed: Aug. 16, 1985

[51] Int. Cl.[4] ............................................. B65D 41/00
[52] U.S. Cl. .................................... 220/359; 220/266
[58] Field of Search ............... 220/265, 266, 270, 359, 220/260; 150/55; 229/43

[56] References Cited

U.S. PATENT DOCUMENTS

| | | | |
|---|---|---|---|
| 4,044,941 | 8/1977 | Knudsen | 220/359 |
| 4,207,989 | 6/1980 | Ingemann | 220/266 |
| 4,215,797 | 8/1980 | Chen | 220/359 |

Primary Examiner—George T. Hall
Attorney, Agent, or Firm—Charles E. Brown

[57] ABSTRACT

This relates to the forging of web-like portions of components so as to increase the density thereof and to shape the material for various purposes. In one form of the invention forging is utilized to form an upstanding sealing rib without a material orientation of the plastic which would result in distortion of the material should it be subjected to retorting. In another form of the invention forge tooling is utilized to provide an element with a hinge strip wherein the core material is compressed without an undue internal stressing of the core material. Most particularly, the tooling is heated to provide a softening of the skin surfaces of the material thereby permitting relative movement of the material which is being forged with respect to the tooling and thereby an internal compressing of the material without shear stresses being developed therein.

11 Claims, 14 Drawing Figures

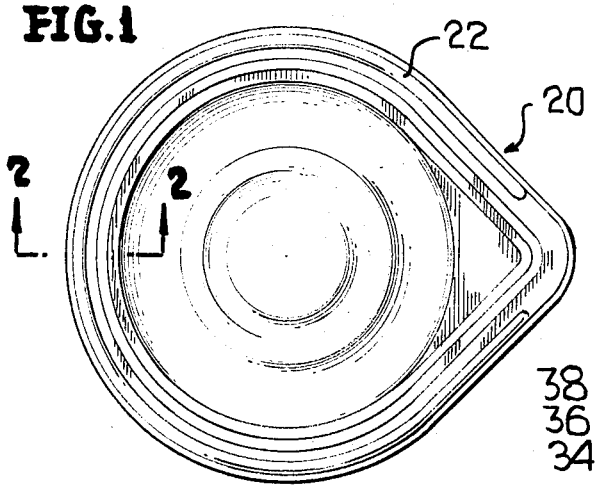
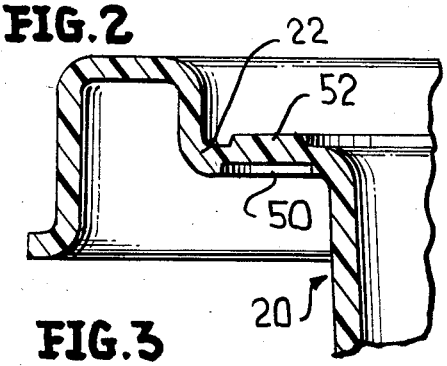
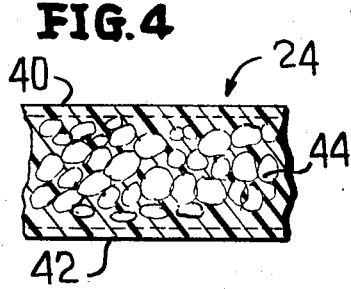
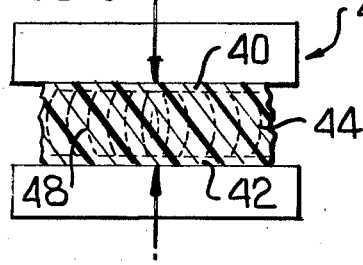
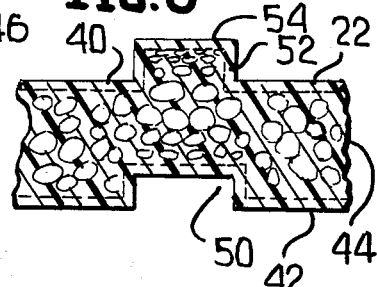
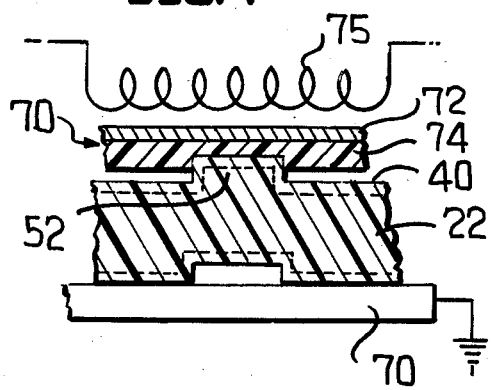
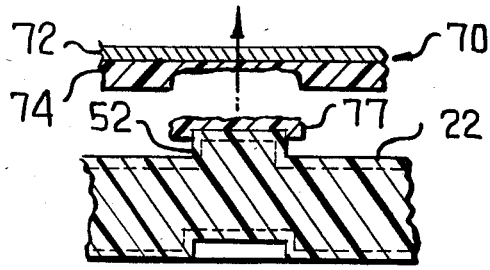
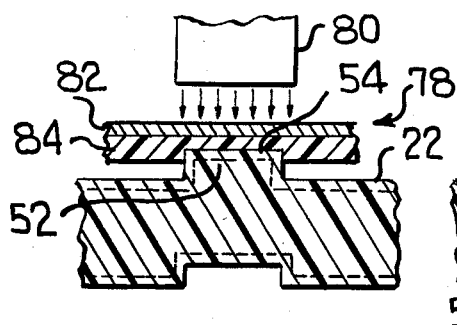
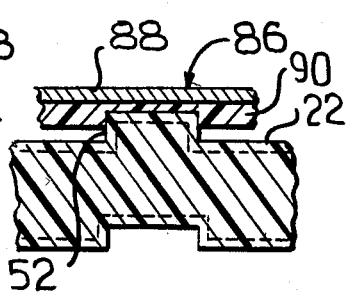
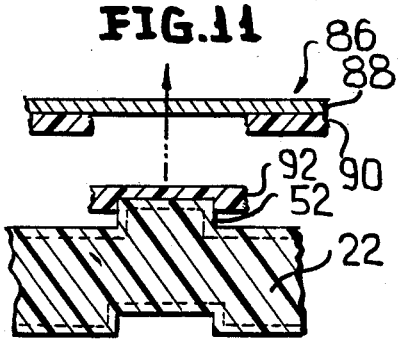

SEALING LIP FOR LID ON THERMOFORMED CONTAINER

This invention relates in general to new and useful improvements in containers, and more particularly the formation of a thermoformed plastic material container having a peripheral lip to which a lid is normally releasably bonded.

This invention particularly relates to a thermoformed container which is formed from a multiple layer laminated web and wherein the lip of the container must be within close tolerances of a preselected uniform thickness.

It is first of all pointed out here that in the forming of the web stock from which the container is thermoformed, it has been found that it is not possible to maintain the thickness of the laminated web within a + or −0.001 inch tolerance. Further, when a web is thermoformed, the web is clamped about a periphery of the thermoforming mold and there is a certain stretching and thinning of the web which may vary from place to place on the container. The net result is that the aforementioned lip of the container is not of a uniform thickness within the permissible tolerances.

It has also been found that when a plastic web is thermoformed or otherwise formed by contacting the same with mold elements, the exposed surfaces of the web first set to define skins, followed by the cooling of the interior of the web with a resultant shrinkage and separation of the internal material.

In order that the container lip may be of sufficiently uniform thickness so as to be properly positioned for receiving a lid, the lip either during or after the thermoforming operation has been compressed to provide the required uniformity of thickness. The net result of the forging or compressing of the lip has been the formation of a high degree of orientation within the material of the lip.

At first thought, the high degree of orientation would appear to be desirable. However, when the containers are of the type which are to be subjected to retorting, it has been found that the retort temperature together with the long period of time a product packaged within the container is retorted results in a release of the orientation and an attempt for the molecules or portions of the lip to return to their original positions before the compressing with the result that the lip twists and distorts the container.

It has been found that when one forges a material having the spaced skins and the porous interior, if there is lubrication between the skins and the forging tooling, the porous interior material will move transversely to the direction of forging together with the skins with a minimum of internal shear stressing while permitting the desired reduction in thickness and resultant increase in density. More particularly, it has been found that the provision of a lubricant between the tooling and the surfaces of the plastic material may be in various forms and may include water, an antifriction material including wax paper and Teflon, and more particularly the controllable heating of the tooling. It will be readily apparent to one skilled in the art that the utilization of water or other liquid as a lubricant or the use of a low friction web material is highly undesirable for commercial purposes, and therefore the surprising effect of lightly heating the tooling to provide the required lubricant is unexpected and highly desirable.

It has further been found that by providing the tooling and forging the lip of a thermoformed plastic container so as to form an upstanding rib on the lip, the beneficial effect of forging may be utilized while at the same time providing for a controlled uniformity of effective thickness of the lip without internally stressing the lip so as to be subjected to undue distortion when the container is retorted.

It has also been found that if the forging rib has sharp corners between sides and the sealing surface of the rib a more effective bond may be obtained between a lid and the rib.

The lid may be formed of various materials and in a preferred embodiment thereof the lid may be a laminate which includes one layer containing iron oxide whereby electrical energy may be induced into that layer and converted into heat and the other layer may be formed of a noncohesive material so that when the other layer is heat bonded to the sealing surface of the rib the lid may be freely peeled from the rib with there being an internal rupture of the noncohesive layer so as to permit the lid to be readily removed.

The lid may also be secured to the rib by other means such as by sonic bonding. It has also been found that the rib is beneficially usable with a lid stock which is a laminate of aluminum foil and a plastic layer wherein the plastic layer will shear and localize the peel from the aluminum foil to permit lid removal.

Separate and apart from the forging of the molded lip of a container, it has been found that when a thermoplastic material has been injection molded to form a strap-like member a hinge in the strap-like member may be readily formed by a forging operation which results in an increase in density of the strap-like member along the line of hinging without an undesirable increase in internal stresses within the strap-like member so as to result in a hinge having much greater strength than one which would be formed in the same strap-like member during the injection molding of such strap-like member.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a plan view of a thermoformed plastic container formed in accordance with this invention.

FIG. 2 is an enlarged fragmentary sectional view taken generally along the line 2—2 of FIG. 1, and shows generally the cross section of a peripheral portion of the container of FIG. 1.

FIG. 3 is an enlargement of the encircled portion of FIG. 2, and shows the many layers of the laminate from which the container is formed.

FIG. 4 is an enlarged fragmentary sectional view similar to FIG. 3, and shows schematically what occurs when a heated web is thermoformed with there being produced external skins and an interior which separates upon cooling and shrinking.

FIG. 5 is an enlarged fragmentary schematic sectional view showing generally what happens when a web portion of the structure of FIG. 4 is compressed or forged.

FIG. 6 is an enlarged fragmentary sectional view similar to FIG. 4, but wherein the lip of the container has been forged in accordance with the invention to define an upstanding sealing rib.

FIG. 7 is an enlarged fragmentary sectional view showing the manner in which a laminated lid is applied to the sealing rib of FIG. 6.

FIG. 8 is another sectional view similar to FIG. 7, showing the lid removed from the container.

FIG. 9 is another sectional view similar to FIG. 7, and showing the lid applied to the sealing rib by way of sonic energy.

FIG. 10 is another sectional view similar to FIG. 7, and shows a lid which is a laminate of a metal foil and a plastic layer being applied to the rib.

FIG. 11 is a sectional view similar to FIG. 10, and shows the lid removed from the container.

Figure 12:
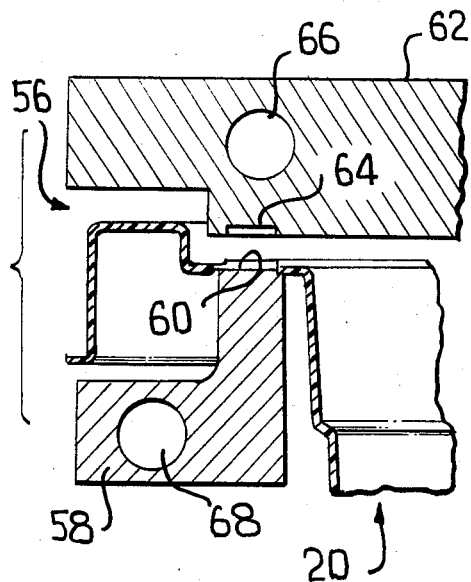
FIG. 12 is a sectional view through tooling formed in accordance with this invention and applied to a container for forming the sealing lip of FIG. 6.
Figure 13:
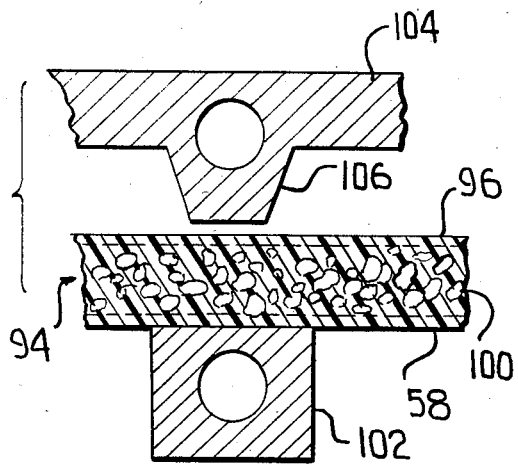
FIG. 13 is a sectional view taken through tooling which is usable in combination with a web for forming a hinge therein while increasing the density of the web and thus the strength of the web along the hinge.

Referring now to the drawings in detail, it will be seen that there is illustrated in FIG. 1 a container generally identified by the numeral 20. The container 20 is in the form of a bowl having, among other features, a peripheral lip 22 to which a lid is to be bonded. As is best shown in FIG. 3, the container 20 is formed from a web 24 which is a seven-layer laminate. These layers may include, in sequence, a polypropylene base layer 26, an adhesive layer 28, a barrier layer 30, an adhesive layer 32, a polypropylene layer 34, and further polypropylene or polyethylene layers 36 and 38. In accordance with known practice, the layers 26–34 are coextruded and then have applied thereto the layers 36, 38.

The web, in practice, has a thickness on the order of 0.020 inch, but this thickness is not controllable and will vary in most instances in excess of + or −0.001 inch.

Furthermore, when the web 24 is clamped with respect to the mold in which it is thermoformed in the forming of the container, there is a tensioning of the heated web, with the heated web stretching differently in the various parts thereof so as to compound the problem of web thickness variation.

Referring now to FIG. 4, there is schematically illustrated what occurs when a highly heated web is thermoformed. Without giving consideration to the specifics of the various layers of the laminated web, it will be seen from FIG. 4 that the thermoformed web 24 will, due to contact with the tooling, be formed with skins 40, 42 while the interior of the web remains at a high substantially molten temperature. The skins 40, 42 determine the shape of the thermoformed article, and gradually the interior of core material 44 will cool and solidify. However, as it does, it begins to separate, resulting in internal stresses.

Attempts have been made to modify the lip 22 of the container 20 by compressing or forging the same between tooling 46 as shown in FIG. 5. The purpose of the compressing or forging is to reduce the thickness of the lip 22 to an accurate dimension, i.e. one where the thickness is within the range + or −0.001 inch. It has been found that the tooling 46 comes into intimate contact with the skins 40 so that when the material of the lip 22 is compressed or forged the core 44 thereof as it reduces in thickness has internal shearing stresses set up therein as indicated by the lines 48. The net result of the forging or compressing is a high degree of orientation which normally is highly desirable. However, the container 20 will normally be utilized in the packaging of a product which involves retorting at a high temperature for a relatively long period of time. As a result of this retorting, the molecules of the core material 44 which previously had a high degree of orientation return to their original relationship before the compressing or forging occurred with the result that the lip 22 in particular becomes twisted and the shape of the container 20 is one presenting an undesirable appearance.

In particular, this invention relates to the forging of the lip 22 so that the thickness of the lip may be uniform within the prescribed limitation while at the same time the orientation of the molecules within the core 44 have not been greatly varied so as to cause distortion of the lip after retorting.

The disadvantages of the above-described compressing or forging of the entire lip 22 have been overcome in accordance with this invention by forging only a limited portion of the lip 22 in the manner shown in FIG. 6. In accordance with FIG. 6, an anvil or support surface of a tool to be described hereinafter is engaged with the skin 42 while a suitable die member is engaged with the skin 40 and when the tooling is brought together a relatively wide shallow recess 50 is formed in the underside of the lip 22 and a narrower upstanding sealing rib 52 projects from the upper surface of the lip 22. The sealing rib 52 has a flat uppermost sealing surface 54 and is preferably formed with sharp corners for a reason to be described in detail hereinafter.

Reference is now made to FIG. 12 wherein the tooling for forming the rib 52 is illustrated. The tooling is generally identified by the numeral 56 and includes a base tool 58 which is annular and includes a support ledge portion 60 of a width to form the recess 50. The second tooling is identified by the numeral 62 and includes an annular recess 64 which is aligned with and in opposed relation to the surface 60. The recess 64 is narrower then the surface 60 and is of a cross section to receive and form the rib 52.

In accordance with this invention, it has been found that there should be a degree of lubrication between the surfaces of the tooling 56 and the skins 40, 42, particularly the skin 40. As has been previously mentioned, it has been found that water or other liquid may function as a suitable lubricant which will permit the skins 40, 42 to slide relative to the tooling and thereby to prevent any relative flowing of the core 44 with respect to the skins 40, 42 in the manner shown in FIG. 5.

It has also been found that the necessary lubrication may be obtained utilizing intermediate features such as wax paper, Teflon and the like. None of these has a practical commercial application.

On the other hand, it has been found that if the tooling 56 is heated to a temperature on the order of 225°–300° F., there will be a softening of the surface of the opposing skins such as to provide for the necessary lubrication. To this end the tool 62 is provided with at least one fluid passage 66 through which a suitable heating liquid may pass.

While it has been found that the desired results can be obtained by heating only the tool 62, it is also desirable to provide the tool 58 with a fluid passage 68 to provide for heating of the tool 58.

It is to be understood that in the forming of the sealing rib 52 there is a resultant controlled overall height or thickness of the lip 22. Thus, the container 20 can be suitably supported and have a cover or lid applied thereto utilizing normal techniques.

Referring to FIG. 7, it will be seen that there is illustrated a laminated lid 70 which is being applied to the sealing rib 52. The lid 70 includes an outer layer which is preferably polypropylene and which has incorproated therein iron oxide. This outer layer is identified by the numeral 72 and is bonded to an inner layer 74 which is also preferably formed of a thermoplastic such as polypropylene. The polypropylene or other plastic material forming the layer 34 will be one having poor internal cohesion. It is also necessary that the polypropylene layer 74 be heat bondable to the layer 38.

In accordance with the invention, while the lip 22 is suitably mounted on a support 76, a high frequency coil 75 is energized and induces electrical energy into the layer 72 with a resultant internal heating of the layer 72 followed by an associated heating of the layer 74 sufficiently to provide a full bond between the lid stock 70 and the rib 52.

It is to be understood that a certain amount of pressure will be applied to the lid 70 with the result that the rib 52 will penetrate the layer 74 a slight amount. The net result will be that the layer 74 will flow down around the rib 52, but will not necessarily come into contact with the skin 40 at the base of the rib 52.

Because of the lack of internal cohesion of the layer 74 when the lid 70 is peeled from the rib 52, a strip 77 of the layer 74 will be peeled thereout of and remain attached to the rib 52 as shown in FIG. 8. The remaining portion of the layer 74 will in no way interfere with the dispensing of a product from the container, nor will it in any way interfere with the sterile integrity of the container 20 and the product packaged therein.

Referring now to FIG. 9, it will be seen that another form of lid 78 which may be of a laminated construction may be applied to the sealing lip 52 utilizing a sonic head 80 which will result in the generation of heat at the inner surface between the lid 78 and the sealing surface 54. If desired, the lid 78 may include an outer layer 82 and an inner layer 84 with the inner layer 84 being of the same material as the layer 74.

It is also feasible to provide in conjunction with the sealing rib 52 a lid 86 which is of a laminated construction and includes an outer aluminum foil layer 88 and an inner thermoplastic layer 90. While the thermoplastic layer 90 is bonded with the metal foil layer 88, the adhesion of the layers 88, 90 is such that there is a greater tendency for the layer 90 to peel from the layer 88 than for the layer 90 to peel from the sealing surface 54. Thus, as shown in FIG. 11, when the lid 86 is removed from the container 20 a strip 92 of the layer 88 will remain bonded to the sealing lip 52 and will peel from the underside of the layer 88.

At this time it is particularly pointed out that in the forming of the sealing rib 52, since the skins 40, 42 are not fixed to the tooling as the core 44 is compressed, the skins may freely slide relative to the tooling so as to prevent any internal stresses of the core 44 which would result in distortion of the lip 22 when the container 20 is subjected to retorting.

The forging operation generally described hereinabove may also be beneficially utilized in conjunction with the formation of the hinge in the thermoplastic material. The thermoplastic material may be formed such as by injection molding although it is feasible that the same material may be shaped by thermoforming. In any event, it is proposed to form a hinge line in the material. To this end, a formed or injection molded web portion 94 having skins 96, 98 and a core 100 may be engaged by a support tool 102 and a die tool 104. The die tool 104 is provided with a depending rib 106 which opposes the support 102.

Figure 14:
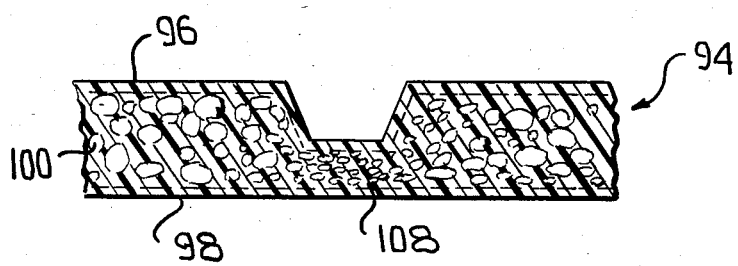
FIG. 14 is an enlarged fragmentary sectional view taken through the web of FIG. 13, and shows the formation of the hinge therein.

Preferably, the support 102 and the forging tool 104 will have means for heating the same to the desired temperature as the material 94 is being shaped. The net result is shown in FIG. 14 wherein the thickness of the material 94 is locally reduced to define a hinge web 108 which is of reduced thickness as compared to the material 94, but in the same manner is of a materially increased density. Thus, the hinge web 108 is of a greater strength than that which would result if the material 94 is injection molded to form the hinge line 108 or the hinge line 108 is formed during a thermoforming or like forming operation.

Although only several aspects of the invention have been particularly described and claimed, it is to be understood that minor variations may be made without departing from the spirit and scope of the invention as defined in the appended claims.

I claim:

1. A container thermoformed from a plastic web, said container comprising a product receiving cavity defined by a bottom and an upstanding side wall arrangement, and a peripheral lip integrally connected to said side wall arrangement remote from said bottom and surrounding said cavity, at least the upper surface of said side wall arrangement being formed of a layer of thermoplastic resin having a porous interior due to cooling and shrinkage of the thermoplastic resin after solidification of a skin-like portion defining said upper surface, and an intermediate width portion of said lip throughout the periphery of said lip having been compressed by forging in the thickness direction of said lip to define on said lip an upstanding peripherally extending rib having an upper free sealing surface arcuately spaced from an underside of said lip.

2. A container according to claim 1 wherein said rib has sides extending away from said sealing surface at sharp corners.

3. A container according to claim 1 wherein in cross section said intermediate width portions show evidence of compaction of said porous interior while being substantially free from shear stresses in the direction of the plane of said lip.

4. A container according to claim 1 wherein said cavity has a product therein, and said cavity is sealed by a lid having a releasable bonded connection with said rib.

5. A container according to claim 4 wherein said lid is formed of a laminate having an underlayer formed of a plastic directly bonded to said rib.

6. A container according to claim 5 wherein said underlayer is formed of a non-cohesive material subject to internal rupture when a peeling force is exerted on said lid to release said lid from said rib.

7. A container according to claim 6 wherein said lid underlayer is heat bonded to said rib.

8. A container according to claim 6 wherein said lid underlayer is sonically bonded to said rib.

9. A container according to claim 6 wherein said non-cohesive material is polypropylene.

10. A molded plastic article having a portion in cross section including spaced dense surface defining skins and a porous interior between said skins resulting from cooling and shrinkage of said plastic after solidification of said surfaces to define said skins, and a local area of said article portion having been forged to increase the density of said local area by compressing said porous interior.

11. An article in accordance with claim 10 wherein said article portion is reduced in cross section to define a dense high strength hinge.

* * * * *